(12) United States Patent
Kang et al.

(10) Patent No.: US 10,318,783 B2
(45) Date of Patent: Jun. 11, 2019

(54) MOBILE TERMINAL

(71) Applicant: LG ELECTRONICS INC., Seoul (KR)

(72) Inventors: Sunghoon Kang, Seoul (KR); Kyungjoon Han, Seoul (KR); Younseob Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 558 days.

(21) Appl. No.: 15/053,897

(22) Filed: Feb. 25, 2016

(65) Prior Publication Data

US 2017/0091514 A1    Mar. 30, 2017

(30) Foreign Application Priority Data

Sep. 25, 2015 (KR) ......................... 10-2015-0137120

(51) Int. Cl.
| | |
|---|---|
| *G06K 9/00* | (2006.01) |
| *G06Q 20/22* | (2012.01) |
| *G06Q 20/32* | (2012.01) |
| *G06Q 20/40* | (2012.01) |
| *H05K 1/02* | (2006.01) |
| *H05K 1/14* | (2006.01) |
| *G06F 1/16* | (2006.01) |
| *G06F 3/0482* | (2013.01) |
| *G06F 3/0354* | (2013.01) |

(52) U.S. Cl.
CPC ......... *G06K 9/00013* (2013.01); *G06F 1/169* (2013.01); *G06F 1/1684* (2013.01); *G06F 3/03547* (2013.01); *G06F 3/0482* (2013.01); *G06K 9/00087* (2013.01); *G06Q 20/227* (2013.01); *G06Q 20/3227* (2013.01); *G06Q 20/40145* (2013.01); *H05K 1/028* (2013.01); *H05K 1/142* (2013.01); *G06F 2203/0338* (2013.01)

(58) Field of Classification Search
CPC combination set(s) only.
See application file for complete search history.

(56) References Cited

U.S. PATENT DOCUMENTS

| | | | |
|---|---|---|---|
| 2010/0082444 A1 | 4/2010 | Lin et al. | |
| 2011/0018288 A1* | 1/2011 | Wang | E05C 19/022 292/341.17 |

(Continued)

FOREIGN PATENT DOCUMENTS

| | | |
|---|---|---|
| CN | 204425433 U | 6/2015 |
| WO | 2015012463 A1 | 1/2015 |
| WO | 2015142031 A1 | 9/2015 |

*Primary Examiner* — Zhitong Chen
(74) *Attorney, Agent, or Firm* — Dentons US LLP

(57) ABSTRACT

The present invention relates to a mobile terminal, which includes a case covering a rear surface of a terminal body, a rear input unit provided at an inner side of the case, externally exposed through the case, and including a first button unit for inputting a first function, and a second button unit for inputting a second function, wherein the first button unit is externally exposed through the second button unit, and a fixing member provided at an inner side of the rear input unit, and capable of fixing the first button unit by being accommodated in a recess outwardly formed in the second button unit, wherein the fixing member is coupled to the second button unit and a finger scan sensor is provided on the first button unit.

14 Claims, 12 Drawing Sheets

(56) References Cited

U.S. PATENT DOCUMENTS

| | | | |
|---|---|---|---|
| 2013/0077215 A1* | 3/2013 | Tada | G06K 9/00006 |
| | | | 361/679.01 |
| 2014/0069789 A1* | 3/2014 | Shah | H01H 11/00 |
| | | | 200/341 |
| 2014/0101737 A1 | 4/2014 | Rhee | |
| 2014/0225821 A1* | 8/2014 | Kim | H04M 1/236 |
| | | | 345/156 |
| 2014/0347330 A1 | 11/2014 | Kim et al. | |
| 2015/0002993 A1 | 1/2015 | Lee et al. | |

* cited by examiner

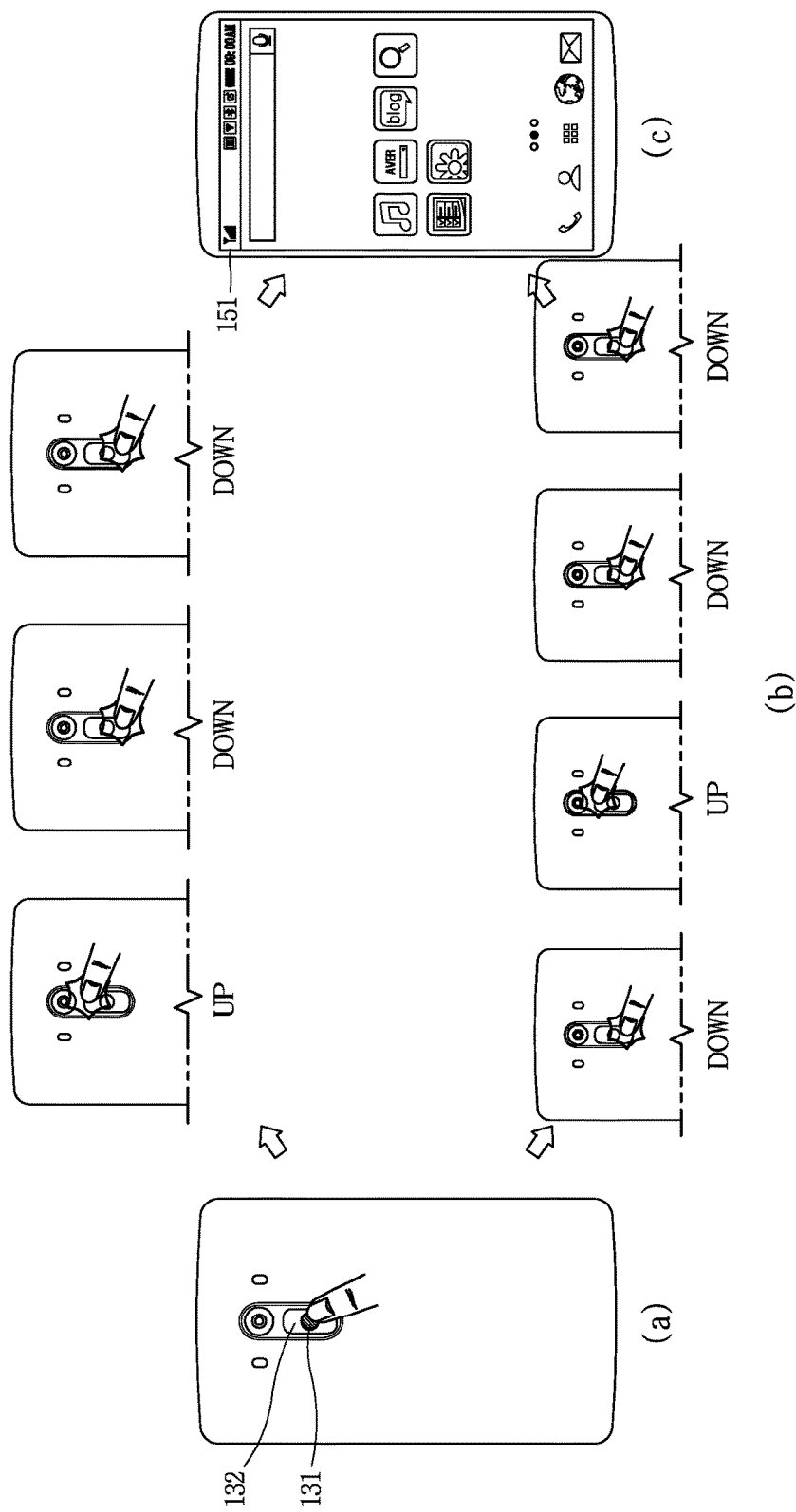

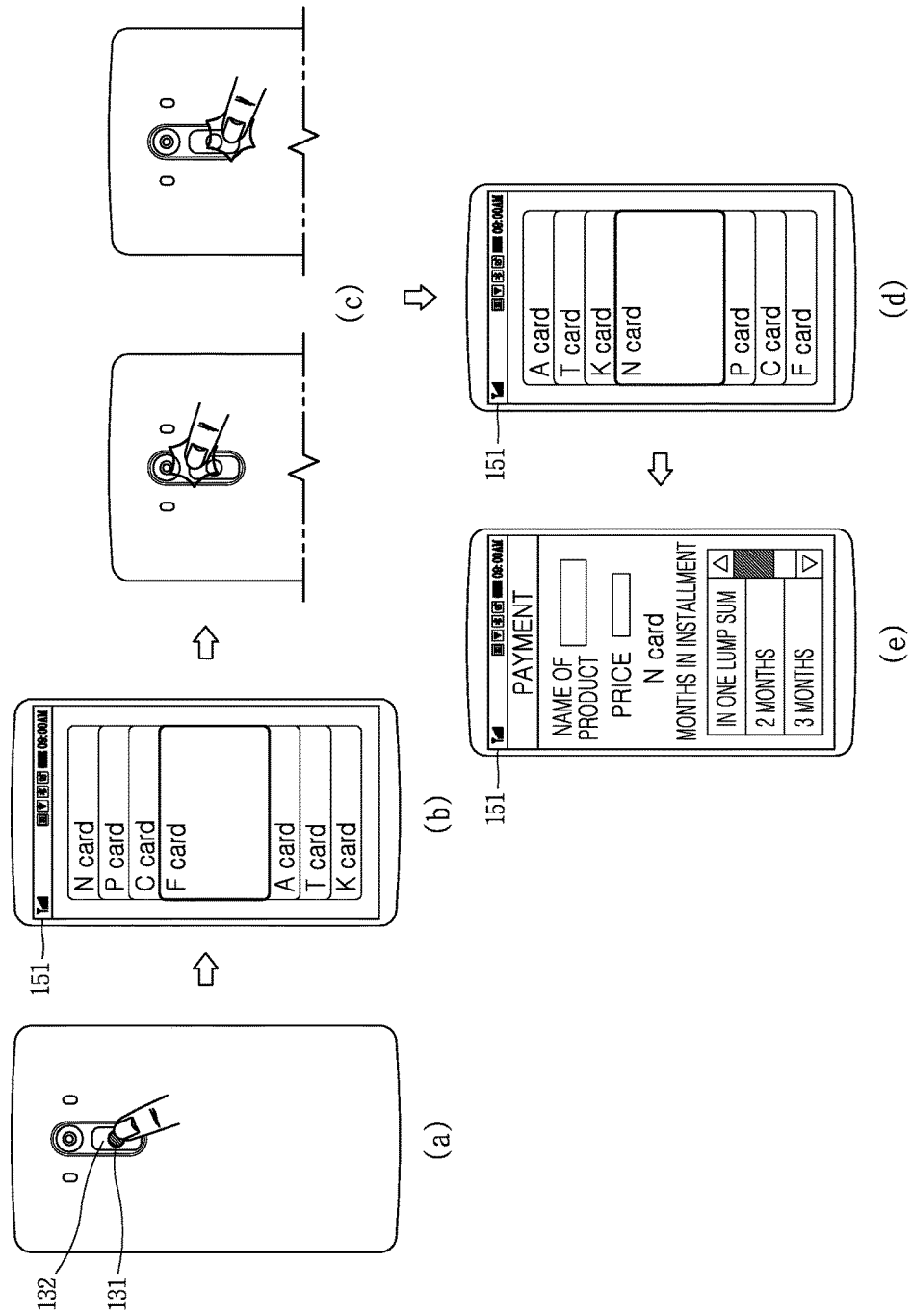

MOBILE TERMINAL

CROSS-REFERENCE TO RELATED APPLICATION

Pursuant to 35 U.S.C. § 119(a), this application claims the benefit of earlier filing date and right of priority to Korean Application No. 10-2015-0137120, filed on Sep. 25, 2015, the contents of which is incorporated by reference herein in its entirety.

BACKGROUND OF THE INVENTION

1. Field of the Invention

This specification relates to a mobile terminal capable of performing a finger scan function.

2. Background of the Invention

Terminals may be divided into mobile/portable terminals and stationary terminals according to their mobility. Also, the mobile terminals may be classified into handheld terminals and vehicle mount terminals according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

In recent time, methods of setting and releasing passwords of (or locking or unlocking) mobile terminals are getting diversified. Also, as purchase of goods through mobile terminals is actively carried out, such mobile terminals are increasingly used to perform payments via credit cards and the like.

In case of authenticating a user by a password including numerals and/or characters, as one of self-authentication methods, the authentication may be likely to be easily performed by another user, not by the user himself or herself, which may lower reliability of the self-authentication during a payment.

In addition, when a finger scan sensor is provided at a rear surface of a mobile terminal, both of a flexible printed circuit board for operating a rear input unit and a flexible printed circuit board for operating the finger scan sensor are employed, which causes an increase in a thickness of the mobile terminal.

SUMMARY OF THE INVENTION

Therefore, an aspect of the detailed description is to solve the aforementioned problems and other drawbacks of the related art. Another aspect of the detailed description is to provide a mobile terminal having a finger scan sensor.

To achieve these and other advantages and in accordance with the purpose of this specification, as embodied and broadly described herein, there is provided a mobile terminal, including a case covering a rear surface of a terminal body, a rear input unit provided at an inner side of the case, externally exposed through the case, and including a first button unit for inputting a first function and a second button unit for inputting a second function, wherein the first button unit is externally exposed through the second button unit, and a fixing member provided at an inner side of the rear input unit, and capable of fixing the first button unit by being accommodated in a recess outwardly formed in the second button unit, wherein the fixing member is coupled to the second button unit and a finger scan sensor is provided on the first button unit.

In accordance with one aspect of the present invention, the mobile terminal may further include a first flexible printed circuit board provided on a rear surface of the first button unit and capable of controlling the finger scan sensor, and a second flexible printed circuit board provided in the fixing member with being spaced apart from the first flexible printed circuit board, and having first and second dome switches to perform the first and second functions in response to the first and second button units being pushed.

In accordance with one aspect of the present invention, the first flexible printed circuit board may externally extend through a groove formed at one side of the fixing member.

In accordance with one aspect of the present invention, wherein the fixing member may be provided with slits dividing points corresponding to the first and second button units.

In accordance with one aspect of the present invention, the mobile terminal may further include a decoration member provided at an inner side of the case, externally exposed through the case, and having a through hole, through which the rear input unit is externally exposed, and a supporting member provided at an inner side of the decoration member to cover the inner side of the decoration member. The supporting member may be arranged to form the same plane with an inner side surface of the case.

In accordance with one aspect of the present invention, the case may be provided with a plurality of hooks protruding inwardly, and the supporting member may support the decoration member by virtue of the hooks.

In accordance with one aspect of the present invention, a plurality of guides may be formed at an edge of the decoration member in a protruding manner, and guide holes may be formed at the supporting member at positions corresponding to the guides such that the guides are inserted therein when coupling the decoration member and the supporting member to each other.

In accordance with one aspect of the present invention, the supporting member may be made of a metal material.

In accordance with one aspect of the present invention, the fixing member may be made of rubber with elasticity.

In accordance with one aspect of the present invention, the decoration member and the second button unit may be provided therein with grooves, respectively, through which the first flexible printed circuit board is inserted.

A mobile terminal in accordance with another exemplary embodiment disclosed herein may include a case covering a rear surface of a terminal body, a rear input unit provided at an inner side of the case, externally exposed through the case, and including a first button unit for inputting a first function and a second button unit for inputting a second function, wherein the first button unit is externally exposed through the second button unit, first and second dome switches provided at an inner side of the rear input unit, and located at positions corresponding to the first and second button units so as to perform the first and second functions in response to the first and second button units being pushed, and a flexible printed circuit board having the first and second dome switches. The flexible printed circuit board may include a first flexible printed circuit board having the first dome switch, and a second flexible printed circuit board having the second dome switches. The first flexible printed circuit board may be located between both ends of the second flexible printed circuit board and arranged on the same plane as the second flexible printed circuit board.

In accordance with one aspect of the present invention, the second button unit may include a finger scan sensor.

In accordance with one aspect of the present invention, the mobile terminal may further include a fixing member provided at an inner side of the flexible printed circuit board and capable of supporting the flexible printed circuit board.

In accordance with one aspect of the present invention, the first and second flexible printed circuit boards may be formed separate from each other. The first dome switch may be formed toward the supporting member, and the second dome switches may be formed toward the second button unit.

In accordance with one aspect of the present invention, the first and second flexible printed circuit boards may be integrally formed with each other, and the first and second dome switches may protrude toward the supporting member.

In accordance with one aspect of the present invention, the first flexible printed circuit board may be connected with a first connector, and the second flexible printed circuit board may be connected with a second connector. The first and second connectors may be electrically connected to a main printed circuit board.

In accordance with one aspect of the present invention, the first and second flexible printed circuit boards may be electrically connected to each other, and a connector may be formed at one side of the flexible printed circuit board and connected to a main printed circuit board.

A mobile terminal in accordance with another exemplary embodiment disclosed herein may include a terminal body having a display unit, a rear input unit having first and second button units receiving user inputs, and a finger scan sensor capable of detecting a fingerprint of a user's finger coming in contact with the first button unit, wherein the rear input unit covers a rear surface of the terminal body, and a controller capable of outputting a screen after an authentication procedure via a fingerprint when the fingerprint detected by the finger scan sensor matches a preset fingerprint.

In accordance with one aspect of the present invention, the second button unit may be divided into an upper button and a lower button, and the first button unit may be located between the upper button and the lower button. An unlock input may be added by using an Up/Down pattern generated using the upper button and the lower button.

In accordance with one aspect of the present invention, a content list may be output on the display unit when the authentication via the fingerprint is completed by pushing the first button unit in an idle state or an inactive state, a specific content may be output in an enlarged manner when the second button unit is scrolled, and the enlarged content may be selected when the first button unit is pushed.

In accordance with one aspect of the present invention, when the content list is a payment-related list, the payment-related list may include payment means and payment methods including credit cards, saving cards, and coupons to be used for payment. A payment means may be selected by use of the first button unit and a payment method may be selected by use of the second button unit.

The payment method may be a payment in a lump sum or in installment over two months.

Effects obtained by a mobile terminal and a method for controlling the same will be described as follows.

In accordance with at least one of exemplary embodiments disclosed herein, a sensor which is capable of scanning a finger may be disposed on a rear input unit. This may allow for simultaneously performing a finger scan function and a first function different from the finger scan function in a manner by pushing the rear input unit, specifically, a first button unit one time.

In accordance with at least one of exemplary embodiments disclosed herein, a printed circuit board for a finger scan and a printed circuit board for a control command input through a rear input unit may be provided separate from each other, and accordingly the input function through the rear input unit and the finger scan function can be applied independent of each other.

In accordance with at least one of exemplary embodiments disclosed herein, a formation of a fixing member may allow for fixing a first button unit of a rear input unit.

In accordance with at least one of exemplary embodiments disclosed herein, the mobile terminal can obtain improved rigidity by virtue of a supporting member made of a metal material, so as to endure a strong force applied thereto or a repetitively-applied load.

In accordance with at least one of exemplary embodiments disclosed herein, a release of a lock state and a self-authentication during a payment can be more firmly carried out by use of a finger scan sensor.

In accordance with at least one of exemplary embodiments disclosed herein, a printed circuit board for inputting a control command through a rear input unit and a printed circuit board for a finger scan can be integrally formed with each other, thereby making the terminal slim in thickness.

In accordance with at least one of exemplary embodiments disclosed herein, a rear input unit may be disposed on a rear surface of the mobile terminal, which may allow a finger scan function to be directly activated without operating a separate screen or application for a finger scan.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 15 is an exemplary view illustrating a release of a lock state in accordance with the third exemplary embodiment disclosed herein; and FIG. 16 is an exemplary view in case of performing a banking related payment in accordance with the third exemplary embodiment disclosed herein.

DETAILED DESCRIPTION OF THE INVENTION

Figure 1A:
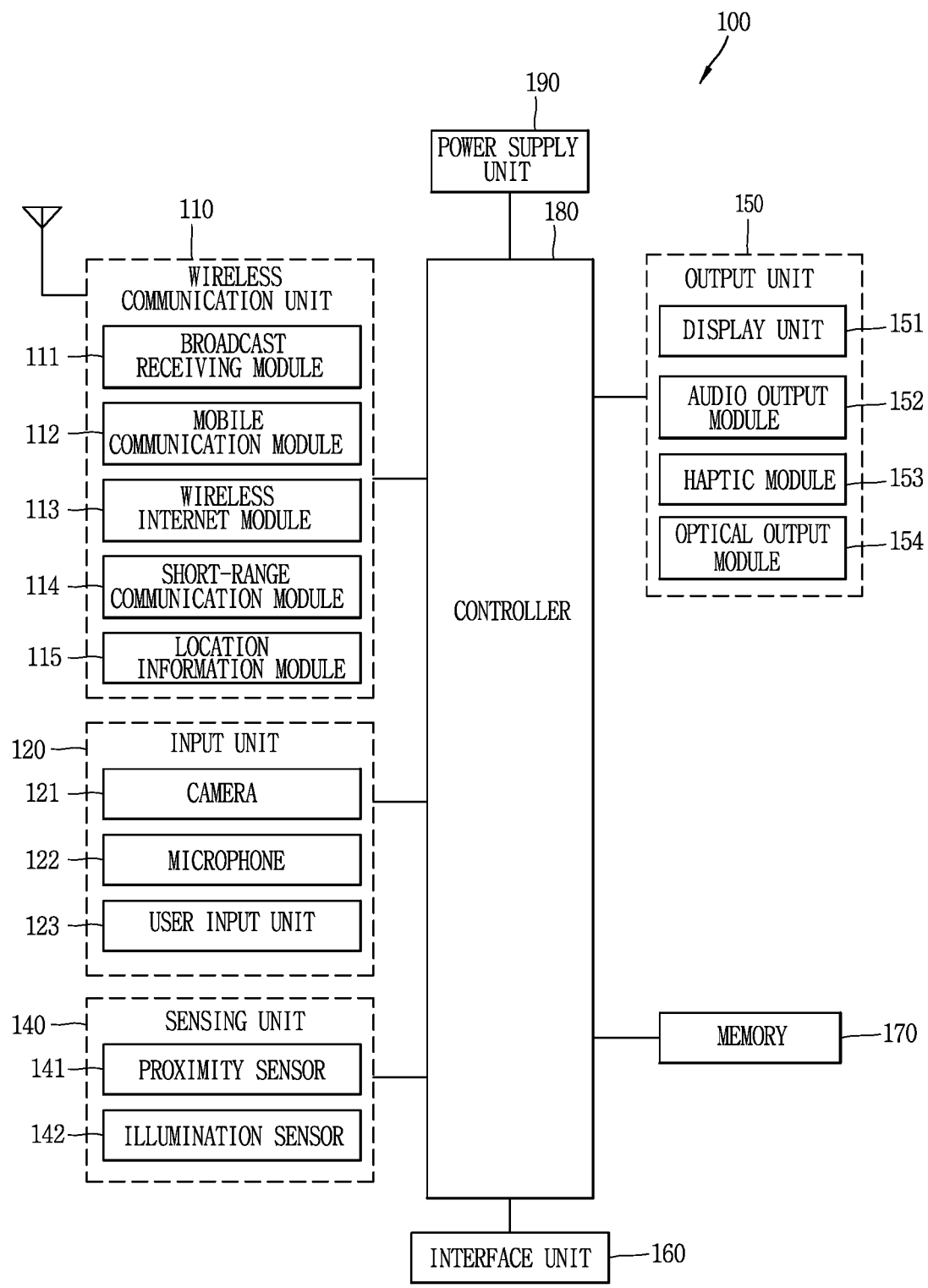
FIG. 1A is a block diagram of a mobile terminal in accordance with the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present invention, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage and the like.

Figure 1B:
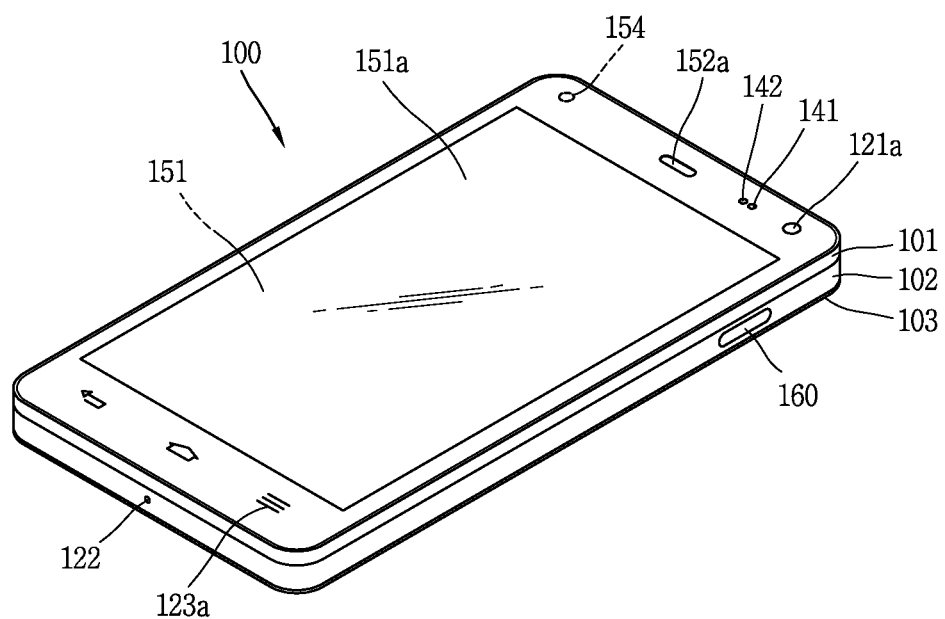
FIGS. 1B and 1C are conceptual views illustrating one example of the mobile terminal, viewed from different directions.
Figure 1C:
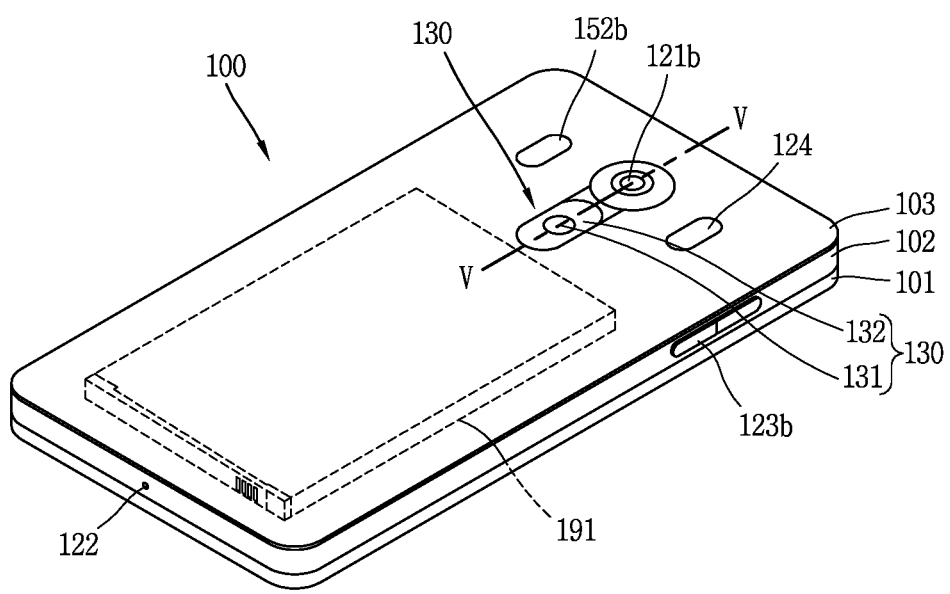

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 may control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

The body of the mobile terminal may be understood to indicate the mobile terminal 100 by regarding the mobile terminal 100 as at least one assembly.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display (not illustrated) on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided at the rear surface of the terminal body, a new type of user interface using this may be implemented. Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 may be configured to receive user's voice and other sounds. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an 'array camera.' When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, embodiments which can be implemented in the mobile terminal 100 having such configuration will be described with reference to the accompanying drawings. It is obvious to those skilled in the art that the present disclosure can be specified into other particular forms without departing from the spirit and essential features of the present disclosure.

Figure 2:
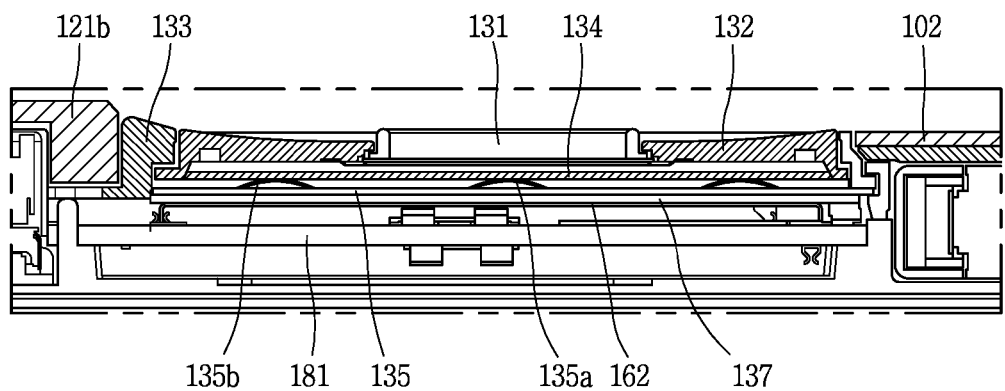
FIG. 2 is a sectional view taken along the line V-V of FIG. 1C.
Figure 3:
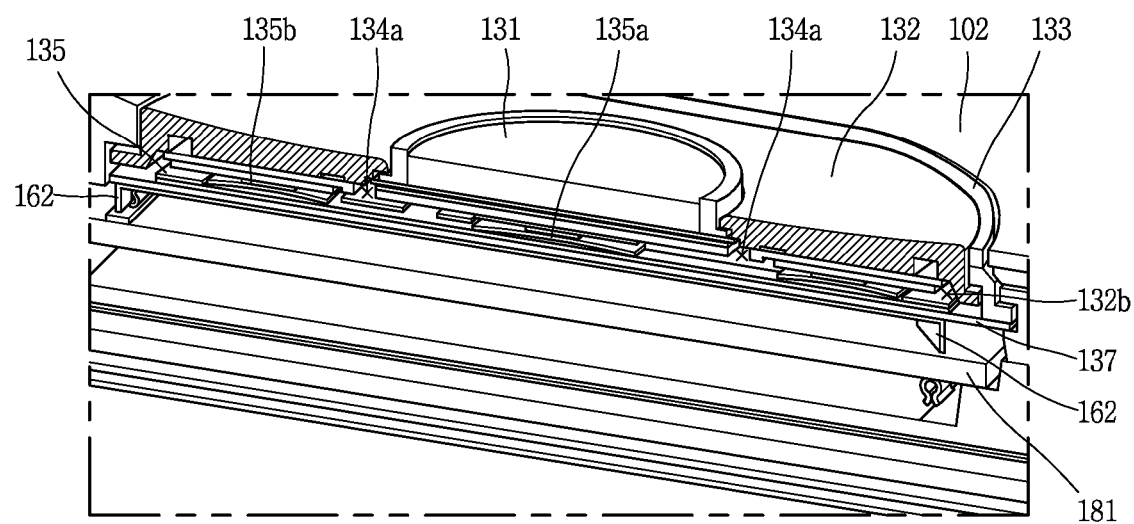
FIG. 3 is a cutoff perspective view taken along the line V-V of FIG. 1C.
Figure 4:
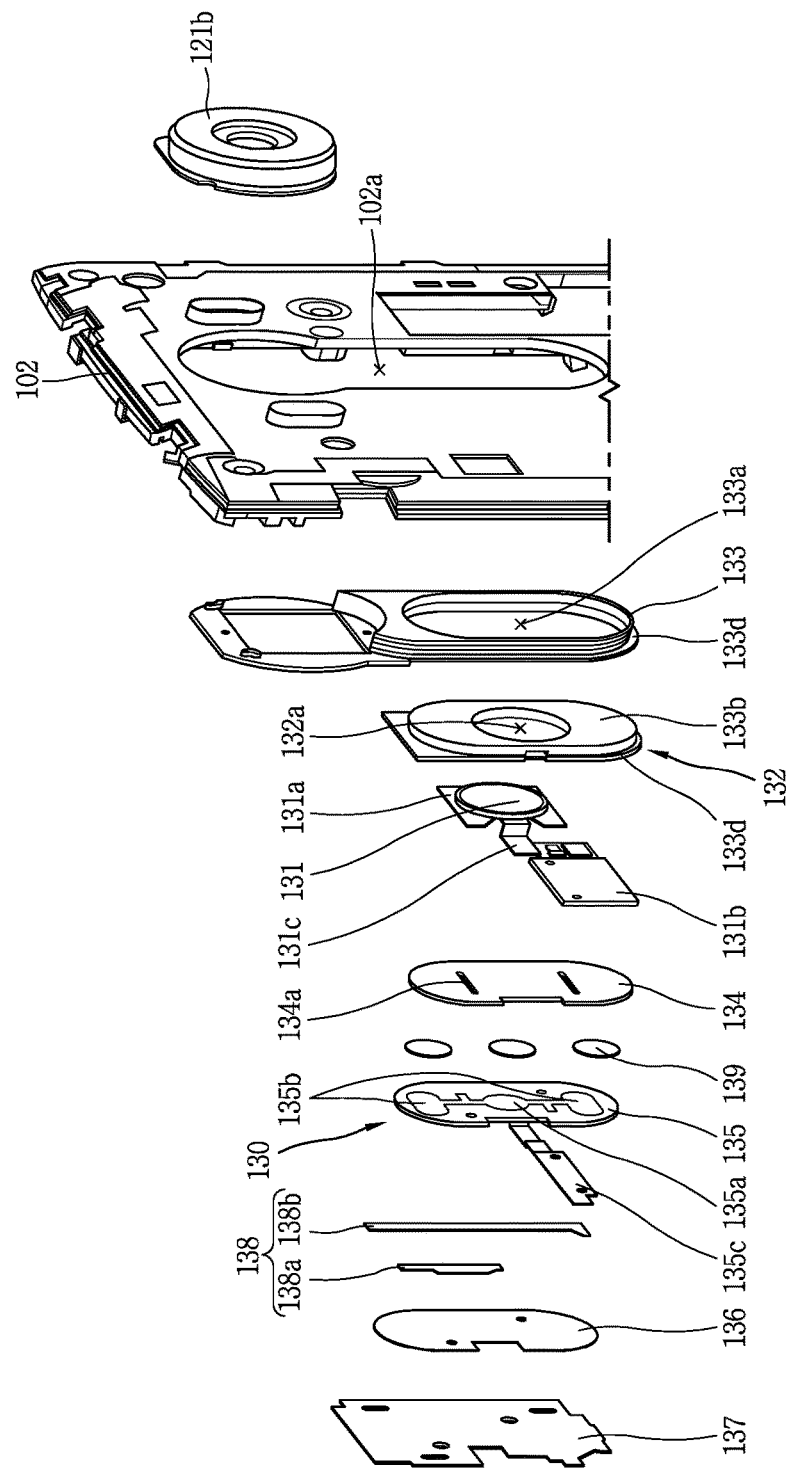
FIG. 4 is an exploded perspective view of a mobile terminal in accordance with one exemplary embodiment disclosed herein.

FIG. 2 is a sectional view taken along the line V-V of FIG. 1C, FIG. 3 is a cutoff perspective view taken along the line V-V of FIG. 1C, and FIG. 4 is an exploded perspective view of a mobile terminal 100 in accordance with one exemplary embodiment disclosed herein. That is, FIGS. 2 and 3 are a sectional view and a perspective view of the mobile terminal 100 having a finger scan sensor 131, specifically, cutoff views based on a rear input unit 130. And, FIG. 4 is a perspective view illustrating components of the mobile terminal 100 based on the finger scan sensor 131.

FIGS. 2 to 9 illustrate a first exemplary embodiment disclosed herein, but may also equally be applied to second and third exemplary embodiments within a non-contravened range.

Hereinafter, a first exemplary embodiment disclosed herein will be described.

Referring to FIGS. 2 to 4, the rear input unit 130 may be disposed at the rear surface of the terminal body. The rear input unit 130, for example, may be located adjacent to the camera module 121b (see FIG. 1C).

Also, the rear input unit 130 may be manipulated by a user to input a command for controlling an operation of the mobile terminal 100, and the input may be set in a variety of different ways. For example, the rear input unit 130 may be used by the user to input a command such as power on/off, start, end or scroll, a command such as an adjusting of a volume level being output from an audio output module, and the like.

As another exemplary embodiment, a sensor for scanning a user's finger by receiving the user's touch input may be provided on one area of the rear input unit 130. In detail, the rear input unit 130 may include a finger scan sensor 131 to recognize a fingerprint of the user's finger which touches or pushes the one area. Meanwhile, the finger scan sensor 131 may alternatively be provided within the display unit 151 or the rear input unit 130. However, the following description will be given of an example in which the finger san sensor 131 is provided in the rear input unit 130, specifically, in a first button unit 131.

The mobile terminal 100 according to one exemplary embodiment may include a case 102 having a first through hole 102a and covering a rear surface of the terminal, and a rear input unit 130 provided at an inner side of the case 102. The rear input unit 130 may be provided with a finger scan sensor 131. The rear input unit 130 may include a first button unit 131 and a second button unit 132. The first button unit 131 may be exposed to outside through the second button unit 132. The case 102 may be a rear case 102 or the rear cover 103, but the following description will be given of an example that the case is the rear case 102. However, the present invention may not be necessarily limited to this, and the case 102 may also be the rear cover 103 which is exposed at the outermost side.

FIG. 4 illustrates the camera module 121b, but this is irrelevant directly to the feature of the present invention, and detailed description thereof will be omitted.

A decoration member 133 may be located at an inner side of the case 102. The decoration member 133 may be externally exposed through the first through hole 102a, and provided with a second through hole 133a formed therethrough. Other components may be accommodated in the decoration member 133. The decoration member 133 may be provided with the second through hole 133a at which the camera module 121b and the rear input unit 130 are located. A part of the decoration member 133 may be exposed through the first through hole 102a, and the rest of the decoration member 133 may be locked at the case 102 to be prevented from being separated to outside. That is, a base portion 133d may be formed along an edge of the decoration member 133. The base portion 133d may have a height which is different from that of the externally-exposed portion of the decoration member 133. This is also the same as the second button unit 132 to be explained later. That is, a base portion 132d may be formed along an edge of the second button unit 132 at a different portion from an externally-exposed portion of the second button unit 132. The base portion 132d may be locked at the second through hole 133a of the decoration member 133.

The rear input unit 130 may include the first and second button units 131 and 132. The second button unit 132 may be located at an inner side of the decoration member 133, externally exposed through the second through hole 133a formed through the decoration member 133, and manipulated to input a control command for a second function. In this instance, the second button unit 132 may be provided with a third through hole 132a in which the first button unit 131 is located. That is, the first button unit 131 may be located at an inner side of the second button unit 132, externally exposed through the third through hole 132a, and perform a function of inputting a control command for a first function. For example, the first function may be a function involved in power on/off or an activation of the display unit 151. The first button unit 131 may be a power key of the terminal. The second function may be a function involved in a scroll of output information of the display unit 151 or an adjustment of a volume level output through the terminal body, but the present invention may not be necessarily limited to this. The one exemplary embodiment disclosed herein includes the decoration member 133. However, the decoration member 133 is employed to form a space in which the rear input unit 130 can be stably disposed. Therefore, the decoration member 133 may not always be required and thus be omitted in some cases.

Also, the one exemplary embodiment disclosed herein may include a fixing member 134 for fixing the first button unit 131 in the second button unit 132. The fixing member 134 may be located at an inner side of the first and second button units 131 and 132, and accommodated in a recess 132b which is recessed in the second button unit 132 toward outside. The fixing member 134 may be made of an elastic material such as rubber. The fixing member 134 may be implemented by any member such as polyurethane, other than rubber, without a specific limit, if the member enables buffering. The recess 132b may be a type of an accommodation groove.

The fixing member 134 may be configured to fix the first button unit 131 such that the first button unit 131 is not moved in the recess 132b. Since the fixing member 134 is elastic, it can transfer an external force to dome switches 135a and 135b when the first and second button units 131 and 132 are pushed. The dome switches 135a and 135b may be provided in the fixing member 134 and convex toward the first and second button units 131 and 132 such that the first function and the second function can be carried out when the first button unit 131 and the second button unit 132 are pushed.

A first flexible printed circuit board 131a for controlling the finger scan sensor may be provided at a rear surface of the first button unit 131. The first and second dome switches 135a and 135b, which are configured to perform the first and second functions upon pushing the first and second button units 131 and 132, may be formed on a second flexible printed circuit board 135 that is spaced apart from the first flexible printed circuit board 131a and located at an inner side of the fixing member 134. In this manner, the first exemplary embodiment disclosed herein illustrates that the first and second flexible printed circuit board 131a and 135 are independent of each other, and the first and second dome switches 135a and 135b are provided at the same flexible printed circuit board 135.

In this instance, the dome switches 135a and 135b refer to switches in a shape of a dome, and may be spaced apart from each other by a predetermined interval on the second flexible printed circuit board 135.

Here, the first button unit 131 may be the finger scan sensor 131. The finger scan sensor 131 may employ both of a method of scanning a fingerprint and comparing the scanned fingerprint with prestored fingerprint data, and a method of capturing a fingerprint through a subminiature camera and comparing the captured fingerprint image with prestored fingerprint data. However, the finger san method and types of sensors may not be specifically limited.

Figure 5:
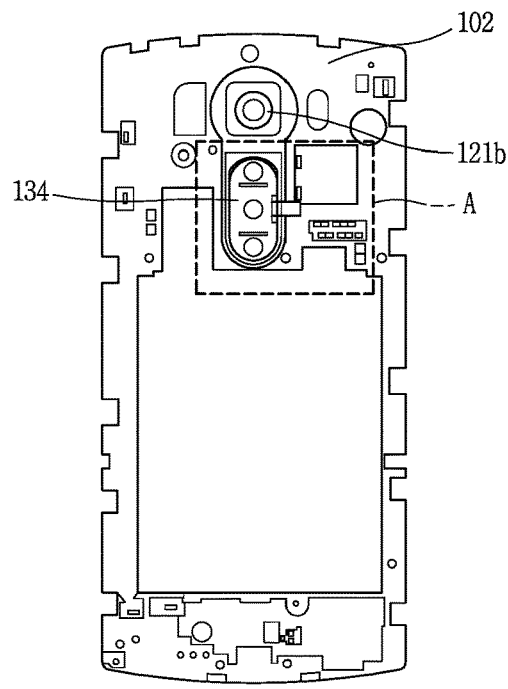
FIG. 5 is a rear view of a rear case in accordance with one exemplary embodiment disclosed herein.
Figure 6:
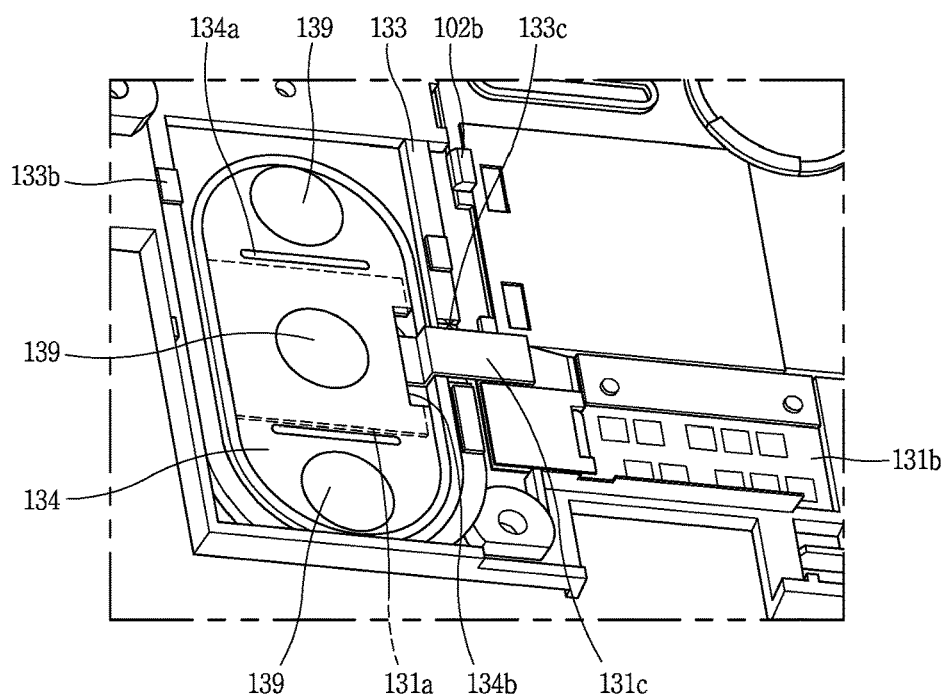
FIG. 6 is an enlarged perspective view of a part A of FIG. 5.

FIG. 5 is a rear view of the rear case 102 in accordance with one exemplary embodiment disclosed herein, and FIG. 6 is an enlarged perspective view of a part A of FIG. 5. Description will be given with reference to FIGS. 5 and 6. The finger scan sensor 131 may be connected to a main printed circuit board 181 through the first flexible printed circuit board 131a. The first flexible printed circuit board 131a may externally extend through a groove 134b that is formed at one side of the fixing member 134. A first connector 131b may be formed at an end portion of the first flexible printed circuit board 131a, and a connecting portion 131c for connecting the first connector 131b to the finger scan sensor 131 may be formed at an area adjacent to the first connector 131b. The connecting portion 131c may correspond to a partial area of the first flexible printed circuit board 131a.

The fixing member 134 may be provided with a pair of slits 134a that are formed therethrough to partition points corresponding to the first and second button units 131 and 132. The second button unit 132 may protrude toward outside. To this end, the second button unit 132 may be provided with the recess 132b recessed from inside to outside thereof. The slits 134a may correspond to through holes formed through the fixing member 134, and may have any shape if they can partition the areas of the first and second button units 131 and 132. For example, those drawings illustrate the slits 134a in a linear shape, but the present invention may not be limited to the linear shape. The slits 134a may also be formed in a circular shape toward an area, which is brought into contact with the second button unit 132, of the fixing member 134.

The fixing member 134 is always pushed when the first button unit 131 or the second button unit 132 is pushed. In this one exemplary embodiment, the slits 134a are formed to prevent a non-pushed button unit from being pushed even when the first button unit 131 or the second button unit 132 is pushed, which results from that the areas corresponding to the first and second button units 131 and 132 are simultaneously formed at the single fixing member 134.

In this instance, insulating members 139 may be interposed between the first and second dome switches 135a and 135b and the fixing member 134, and the first and second dome switches 135a and 135b may protrude toward the fixing member 134.

The first button unit 131 and a part of the first flexible printed circuit board 131a may be accommodated in the recess 132b, and the first flexible printed circuit board 131a may extend up to the first connector 131b. In this instance, the first flexible printed circuit board 131a may extend from a contact portion with the finger san sensor 131 toward one side by the connecting portion 131c. Accordingly, when the first button unit 131 or the second button unit 132 is pushed, the first flexible printed circuit board 131a may non-uniformly be pushed. That is, as illustrated in FIG. 6, when the first button unit 131 is pushed, since the connecting portion 131c is located toward a right side, a left area of the first flexible printed circuit board 131a may form a free end and a right area of the first flexible printed circuit board 131a may be relatively fixed rather than the left area. Due to this, the first button unit 131 may be likely to be tilted to one side upon being pushed. To prevent the tilting to the left or right side when the finger scan sensor 131 is pushed, the one exemplary embodiment disclosed herein illustrates an escape area formed at a partial area, adjacent to the finger scan sensor 131, of the connecting portion 131c of the first flexible printed circuit board 131a. In this manner, the formation of the escape area may allow the second button unit 132 to be uniformly pushed to left or right upon pushing the second button unit 132. To form the escape area, the second button unit 132, the decoration member 133 and the fixing member 134 may be provided with grooves 132c, 133c and 134b, respectively.

In more detail, in order for the connecting portion 131c to externally extend through the decoration member 133 and the fixing member 134, the grooves 134b and 133c may be formed at one side of each of the fixing member 134 and the decoration member 133.

Also, a second connector 135c may be provided at an end portion of the second flexible printed circuit board 135 so as to be connected to the main printed circuit board 181. Or, in a state that both of the first connector 131b and the second connector 135c are provided, only one of the first connector 131b or the second connector 135c may be connected to the main printed circuit board 181.

In the one exemplar embodiment, the first flexible printed circuit board 131a and the second flexible printed circuit board 135 may be provided separate from each other, which may allow a finger scan by the finger scan sensor 131 and the first function involved in the first button unit 131 to be independently performed. That is, in the one exemplary embodiment disclosed herein, the finger scan sensor 131, which is a portion exposed to the outermost side so as to come in contact directly with a user's body, may be brought into contact with the user's fingerprint, but may not always be allowed to perform the finger scan. The finger scan sensor 131 may perform the first function in a general mode, and scan the user's finger only in a finger scan mode. The finger scan function may be automatically performed by the finger scan sensor 131 when the finger scan mode is set in the mobile terminal 100 or a specific application is performed. To this end, as illustrated in FIG. 4, the first flexible printed circuit board 131a for the finger scan and the second flexible printed circuit board 135 for the first function can be separately provided. However, even in this instance, as aforementioned, the first flexible printed circuit board 131a and the second flexible printed circuit board 135 may be electrically connected to each other. In other words, the one exemplary embodiment disclosed herein illustrates the flexible printed circuit board 131a for the finger scan and the flexible printed circuit board 135 for the first and second functions are independent of each other.

Meanwhile, a supporting member 137 which covers an inner side of the decoration member 133 may further be provided at an inner side of the decoration member 133. The supporting member 137 may be disposed to be flush with an inner side surface of the case 102 and thus serve as a reinforcing plate.

Figure 7:
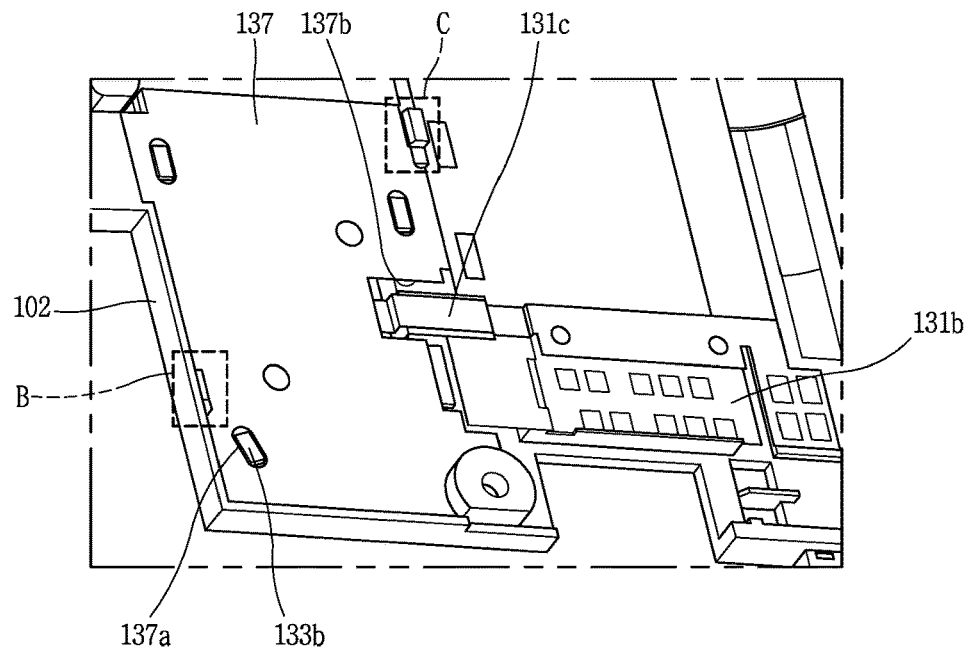
FIG. 7 is an inner perspective view of a rear case in a state that a rear input unit is covered with a supporting member in accordance with one exemplary embodiment disclosed herein.

FIG. 7 is an inner perspective view of a rear case in a state that the rear input unit 130 is covered with the supporting member 137 in accordance with one exemplary embodiment disclosed herein. Referring to FIGS. 6 and 7, the first and second button units 131 and 132, the fixing member 134 and the first flexible printed circuit board 131a may be accommodated in the decoration member 133 and the supporting member 137 may cover those components. The supporting member 137 may be attached to the decoration member 133 by an adhesive tape 138 (138a and 138b; see FIG. 4). A plurality of assembling guides 133b may be provided at an edge of the decoration member 133. Guide holes 137a in which the assembling guides 133b are inserted when the decoration member 133 is coupled may be formed at the supporting member 137 at positions corresponding to the assembling guides 133b. However, the guides 133b may not have to always be formed at the decoration member 133. The guides 133b may alternatively be formed at the fixing member 134 or the rear surface of the first button unit 131. The guides 133b and the guide holes 137a may facilitate the coupling of the supporting member 137.

The adhesive tapes 138a and 138b may have different lengths from each other, taking into account the positions of the guides 133b. That is, a shorter adhesive tape 138a may be attached to a portion locked by the guides 133b which are formed at a shorter interval, and a longer adhesive tape 138b may be attached to a portion locked by the guides 133b which are formed at a greater interval.

The second flexible printed circuit board 135 may cover the fixing member 134. To this end, an adhesive member 136 which is attached to the fixing member 134 or the inner side surface of the second button unit 132 may be provided. After the adhesive member 136 is attached, the supporting member 137 may be coupled to the decoration member 133. The adhesive tape 138 and the adhesive member 136 may be both-sided tapes.

Figure 8:
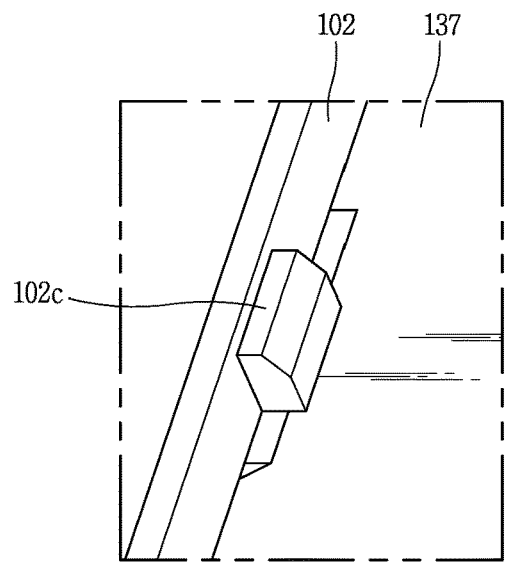
FIG. 8 is an enlarged view of a part B of FIG. 7.
Figure 9:
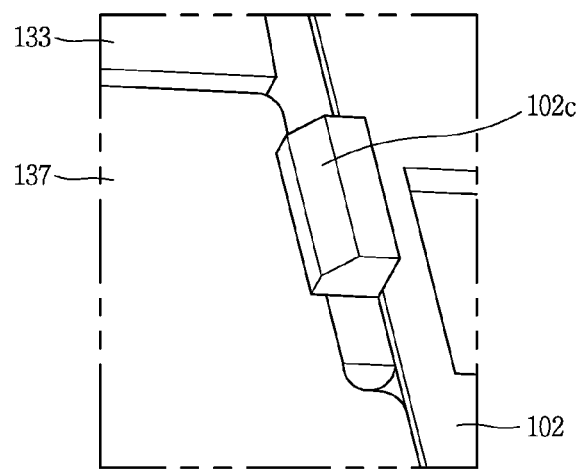
FIG. 9 is an enlarged view of a part C of FIG. 7.

As aforementioned, the supporting member 137 may be flush with the inner side surface of the case 102. FIGS. 8 and 9 are enlarged views of parts B and C of FIG. 7. Referring to FIGS. 8 and 9, a plurality of hooks 102c which inwardly protrude may be provided in the case 102, and the supporting member 137 can support the decoration member 133 by virtue of the hooks 102c. That is, the supporting member 137 may be locked by the hooks 102c to be prevented from being separated to outside. Even when pushing the first and second button units 131 and 132, the supporting member 137 can stably support the first and second button units 131 and 132. To this end, the supporting member 137 may be made of a metal material (e.g., SUS). In addition, in the one exemplary embodiment disclosed herein, a shield can 162 made of a metal may be provided in the supporting member 137 to more firmly support the first and second button units 131 and 132. The shield can 162 may also perform a function of reducing electromagnetic interference. In this instance, the hooks 102c may be located more inside than a plane which is formed by the supporting member 137. That is, the supporting member 137 may be disposed more outwardly than the hook 102c. Even in this instance, the supporting member 138 may be provided with a groove 137b to prevent the connecting portion 131c from pressing an externally-extending portion. The groove 137b may be formed at a side of the supporting member 137.

Meanwhile, the foregoing embodiment has illustrated that the second flexible printed circuit board 135 having the first and second dome switches 135a and 135b is formed as one component. Unlike this, an example in which the first and second dome switches 135a and 135b are formed at different flexible printed circuit boards, respectively, will be explained. Hereinafter, a second exemplary embodiment related to this will be described.

Figure 10:
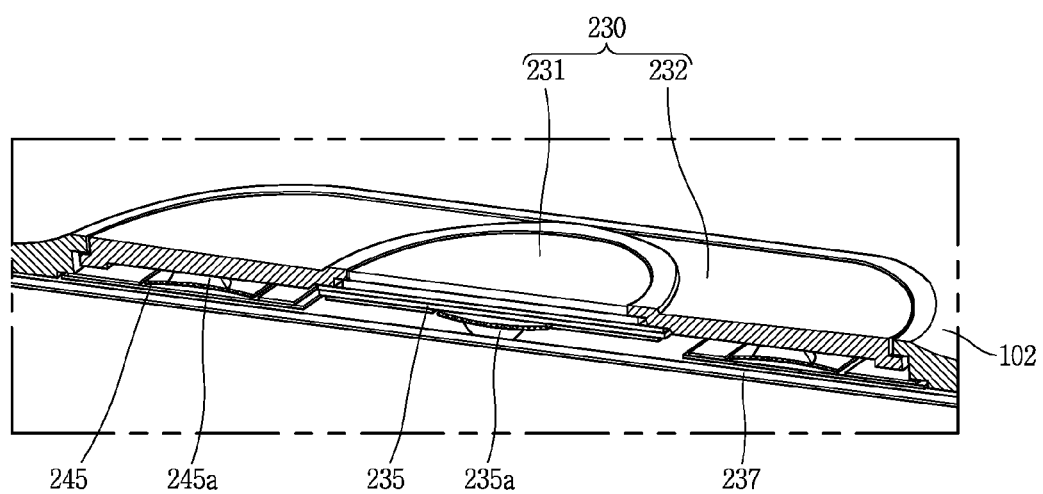
FIG. 10 is a cutoff perspective view including a rear input unit in accordance with a secondary exemplary embodiment disclosed herein.
Figure 11A:
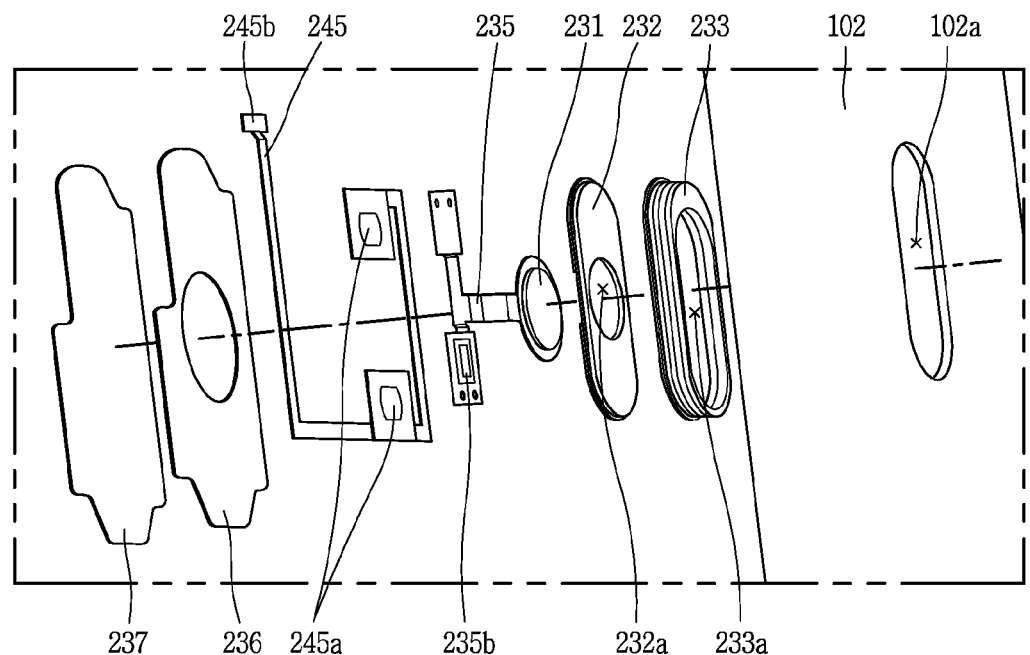
FIG. 11A is an exploded perspective view of FIG. 10.
Figure 11B:
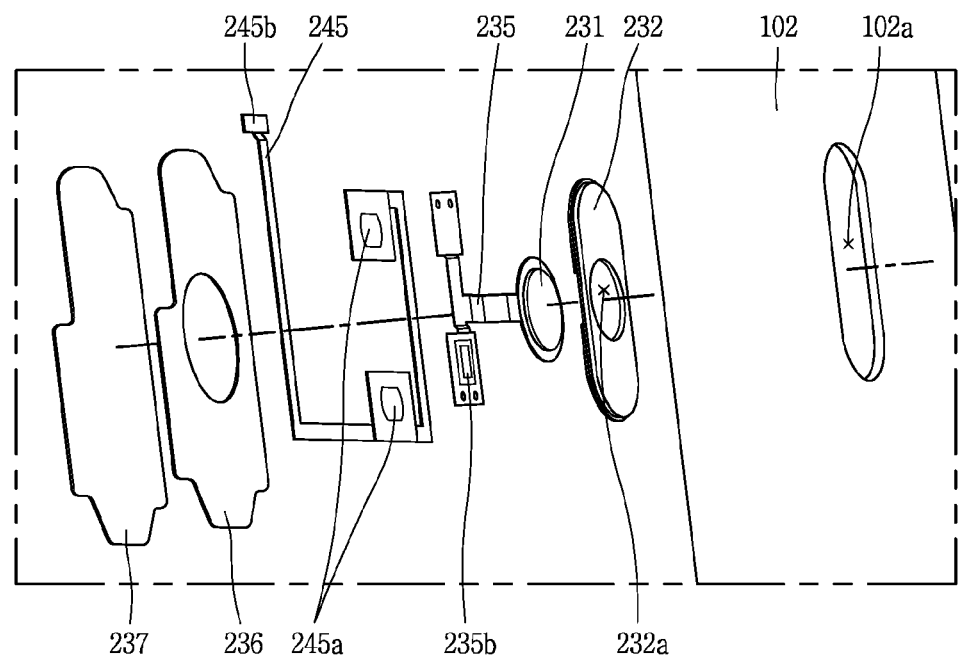
FIG. 11B is an exploded perspective view additionally including a decoration member.

FIG. 10 is a cutoff perspective view including a rear input unit in accordance with a secondary exemplary embodiment disclosed herein, FIG. 11A is an exploded perspective view of FIG. 10, and FIG. 11B is an exploded perspective view additionally including a decoration member. Referring to FIGS. 10 to 11B, the mobile terminal 100 according to the second exemplary embodiment disclosed herein may include, as the same as the first exemplary embodiment, a case 102 having a first through hole 102a therein and covering a rear surface of the terminal, a decoration member 233 located at an inner side of the case 102, externally exposed through the first through hole 102a, and having a second through hole 233a formed therethrough, a second button unit 232 externally exposed through the second through hole 233a, having a third through hole 232a formed therethrough, and manipulated to input a control command for a second function, and a first button unit 231 disposed in the second button unit 232, externally exposed through the third through hole 232a, and manipulated to input a control command for a first function. Also, the mobile terminal 100 according to the second exemplary embodiment disclosed herein may include first and second dome switches 235a and 245a located at an inner side of the first and second button units 231 and 232 and operating the first and second button units 231 and 232 when the first and second button units 231 and 232 are pushed, and first and second flexible printed circuit boards 235 and 245 having the first and second dome switches 235a and 245a.

Even in the second exemplary embodiment disclosed herein, the decoration member 233 merely serves as a supplementary component for supporting the first and second button units 231 and 232 and thus is not an essential component. Therefore, even in the second exemplary embodiment disclosed herein, the decoration member 233 may also be omitted in some cases. That is, the decoration member 233 may be omitted as illustrated in FIG. 11A, or provided as illustrated in FIG. 11B.

In the second exemplary embodiment disclosed herein, the first and second flexible printed circuit boards 235 and 245 having the first and second dome switches 235a and 245a may be divided into the first flexible printed circuit board 235 having the first dome switch 235a connected to a finger scan sensor 231, and a second flexible printed circuit board 245 having the second dome switches 245a connected to the second button unit 232.

Figure 12:
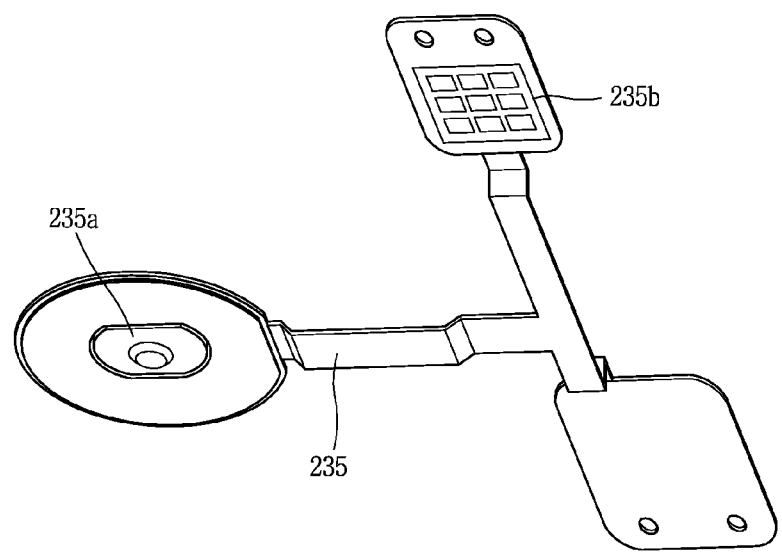
FIG. 12 is a rear perspective view of a first flexible printed circuit board in accordance with the second exemplary embodiment disclosed herein.

In this instance, the first flexible printed circuit board 235 may be located at an inner space of the second flexible printed circuit board 245, at the same plane or same height as the second flexible printed circuit board 245. To this end, the first flexible printed circuit board 235 may have a shape similar to an alphabet 'T' and the second flexible printed circuit board 245 may have a shape similar to an alphabet 'C.' FIG. 12 is a rear perspective view of the first flexible printed circuit board 245 in accordance with the second exemplary embodiment disclosed herein. As illustrated in FIG. 12, it can be understood that the first flexible printed circuit board 235 has the 'T'-like shape. In more detail, the second dome switches 245a which are provided as a pair may be disposed by being spaced apart from each other, and the first dome switch 235a may be disposed between the spaced second dome switches 245a. A first connector 235b may be spaced apart from the first dome switch 235a, and thus only a portion where the first dome switch 235a is formed may be located between the pair of second dome switches 245a.

Similar to the first exemplary embodiment, the first button unit 231 in the second exemplary embodiment may include the finger scan sensor 231, and a fixing member 237 for supporting the first and second flexible printed circuit boards 235 and 245 may be provided at an inner side of the first and second flexible printed circuit boards 235 and 245.

Figure 13:
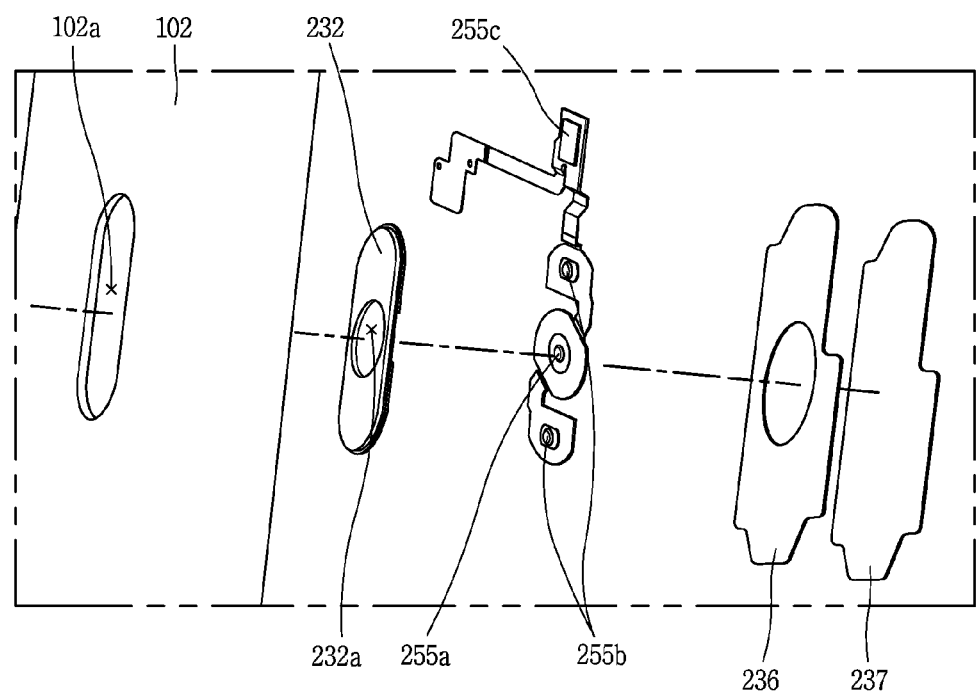
FIG. 13 is an exploded perspective view involved in the second exemplary embodiment disclosed herein.

The first and second flexible printed circuit boards 235 and 245 may be formed integrally or separately. FIGS. 11 and 12 illustrate the separately-formed example, and FIG. 13 illustrates the integrally-formed example.

As illustrated in FIGS. 11 and 12, when the first and second flexible printed circuit boards 235 and 245 are formed separate from each other, the first connector 235b may be connected to the first flexible printed circuit board 235 and a second connector 245b may be connected to the second flexible printed circuit board 245. The first and second connectors 235b and 245b may electrically be connected to a main printed circuit board 181. The first and second dome switches 235a and 245a may protrude in opposite directions to each other. For example, as illustrated in FIG. 10, the first dome switch 235a may protrude toward the fixing member 237, and the second dome switches 245a may protrude toward the second button unit 232.

Even in the second exemplary embodiment, the first flexible printed circuit board 235 having the finger scan sensor 231 and the second flexible printed circuit board 245 having the second dome switches 245a may operate independent of each other. In more detail, even if the finger scan sensor 231 is pushed along with the first button unit 231 when the first button unit 231 is pushed, the finger scan sensor 231 may not always operate, but scan a finger only when the first button unit 231 is pushed in a finger scan mode.

In the second exemplary embodiment, the first and second dome switches 235a and 245a may be formed in the same direction or opposite directions to each other. In order for the first and second dome switches 235a and 245a to face different directions, as illustrated in FIGS. 11 and 12, the first flexible printed circuit board 235 and the second flexible printed circuit board 245 may preferably be formed separate from each other. When the first and second flexible printed circuit boards 235 and 245 are formed separate from each other, the first dome switch 235a may be provided on a rear surface of the finger scan sensor 231, and located between both ends of the second flexible printed circuit board 245. That is, the second flexible printed circuit board 245 may have the shape similar to the alphabet 'C' and the second dome switches 245a may be provided at the both ends of the second flexible printed circuit board 245.

Meanwhile, when the first and second flexible printed circuit boards 235 and 245 are integrally formed with each other, as illustrated in FIG. 13, the first and second dome switches 235a and 245a may be formed in the same direction, for example, protrude toward the fixing member 237.

FIG. 13 illustrates an exemplary variation of the second exemplary embodiment, which is the same as the exemplary embodiment illustrated in FIGS. 11 and 12, excluding that the first and second flexible printed circuit boards 235 and 245, which have been separately formed in FIGS. 11 and 12, are configured as one flexible printed circuit board 255. In more detail, FIG. 11 illustrates that the first dome switch 235a is formed on the first flexible printed circuit board 235, the second dome switches 245a are formed on the second flexible printed circuit board 245, and the first and second flexible printed circuit boards 235 and 245 are separately formed from each other. FIG. 13 illustrates that a first dome switch 255a and second dome switches 255b are formed on a single flexible printed circuit board 255 in the same direction. The formation of the first and second dome switches 255a and 255b simultaneously on the single flexible printed circuit board 255 may result in a reduction of a material. FIG. 13 omits a fixing member 133.

Also, in FIG. 13, one connector 255c can be connected to the main printed circuit board 181, thereby reducing the number of components connected. However, even in this instance, the finger scan sensor 231 may be provided on a rear surface of the first dome switch 255a.

Meanwhile, in one exemplary embodiment disclosed herein, the finger scan sensor 231 can perform the finger scan operation, which can be used in various manners. For example, the finger scan sensor 231 can be used when self-authentication is required for releasing a lock state, making a payment via a card, and the like.

Hereinafter, a third exemplary embodiment related to this will be described in more detail.

A method of utilizing a finger scan function may be applicable to any of the first and second exemplary embodiments. That is, the mobile terminal 100 according to the third exemplary embodiment may include a terminal body having a display unit 151, a rear input unit 130, 230 having first and second button units 131, 132, 231, 232 for receiving user inputs, and provided with a finger scan sensor 131, 231 for scanning the user's finger contacting the first button unit 131, 231, and a controller 180 (see FIG. 1A) for outputting a screen after an authentication procedure by use of the fingerprint when the fingerprint scanned by the finger scan sensor 131, 231 matches a preset fingerprint. Hereinafter, for the sake of explanation, description will be given based on the mobile terminal 100 illustrated in the first exemplary embodiment.

Meanwhile, even when a screen is released from an idle state or an inactive state through the rear input unit 130, 230, a separate input for releasing a lock state is required, which still lowers the user's convenience.

To overcome this problem, the third exemplary embodiment disclosed herein proposes a method of releasing a lock state of a screen and executing an application accordingly in the mobile terminal 100 having the rear input unit 130 and the finger scan sensor 131.

Hereinafter, the third exemplary embodiment will be described in more detail with reference to the drawings.

In the third exemplary embodiment disclosed herein, a lock state of a screen refers to a state converted from a first screen to a second screen when an input is not applied by a user or system for a predetermined period of time or more. Meanwhile, the release of the lock state may be carried out when the second screen is converted back into the first screen in response to a preset release (unlock) input applied by the user. The release input may be at least one of a pattern release input according to whether or not the pattern matches a prestored pattern, a knock release input according to whether or not a knock touch is applied to a divided area on the display unit, and a face recognition release input according to whether or not a face matches the user's face.

The inactive state of the screen refers to a state that any input is not applied by the user or system for a predetermined period of time or more, namely, a state that the screen is maintained in a turnoff state until before the user inputs a return input for activating the screen. The return input may be applied in a manner of pushing or touching a home button of the mobile terminal 100. In this instance, the screen may be converted into an active state by the return input, but the second screen is still maintained until before the release input is applied.

In case of performing the release of the lock state by the finger scan sensor 131, an up/down pattern may further be set by using the second button unit 132 in order to more firmly release the lock state by the finger scan in a state where at least one of various preset unlocking methods, for example, unlocking by a pattern input, unlocking by a knock and unlocking by the user's face recognition has been set.

In addition, it may be similar even when the lock state is set to be released by an input of a fingerprint. That is, even if self-authentication has successfully been carried out through the finger scan, the lock state may be released only by secondarily inputting the up/down pattern. For example, FIG. 15 is an exemplary view illustrating a release of a lock state in the third exemplary embodiment disclosed herein. As illustrated in (a) of FIG. 15, upon inputting a fingerprint through the finger scan sensor 131, if the fingerprint input through the finger scan sensor 131 matches a preset fingerprint, the lock state may be released through the finger scan. Afterwards, as illustrated in (b) of FIG. 15, a pattern may be set as a three-sequential input such as Up/Down/Down or a four-sequential input such as Down/Up/Down/Down. The Up/Down pattern may be input by pressing or pushing an upper button 1321 and/or a lower button 1322 of the second button unit 132. Accordingly, as illustrated in (c) of FIG. 15, when the preset Up/Down pattern is input, the lock state may be released and an application may thusly be executed. A number of such a pattern may be randomly set by the user.

Also, when the authentication procedure through the fingerprint is completed by pushing the first button unit 131 in the idle state or the inactive state in the third exemplary embodiment disclosed herein, a content list within the terminal may be output on the display unit 151. Contents may be output by pushing and scrolling the second button unit 132, and then a specific content may be selected by pushing the first button unit 131. In this instance, the contents may sequentially be output in an enlarged state by the scroll.

Figure 14:
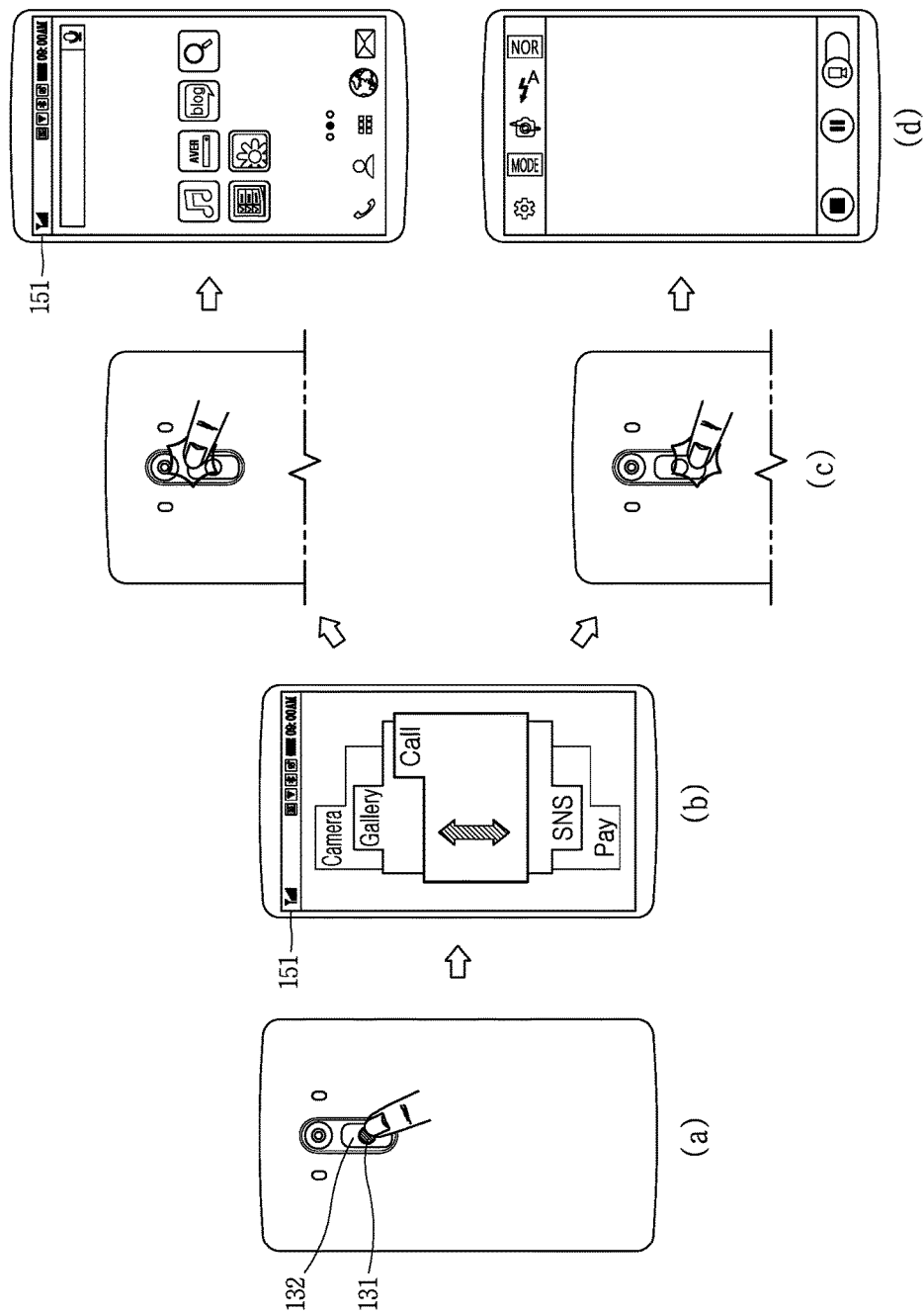
FIG. 14 is an exemplary view illustrating a case of directly entering a content or application in an unlocking manner in accordance with a third exemplary embodiment disclosed herein.

That is, FIG. 14 is an exemplary view illustrating an example of directly entering a content or application by releasing the lock state in accordance with the third exemplary embodiment disclosed herein. Referring to FIG. 14, as illustrated in (a) of FIG. 14, when the user pushes the finger scan sensor 131, the authentication procedure via the finger scan may be completed. Accordingly, as illustrated in (b) of FIG. 14, a list of various contents (or applications) may be output. As illustrated in (c) of FIG. 14, the upper button 1321 or the lower button 1322 of the second button unit 132 may be pushed to search for a content desired to operate, and then the first button unit 131 may be pushed to execute the desired content. In this instance, an upper drawing of (d) of FIG. 14 illustrates an entrance into a default screen state, and a lower drawing illustrates an entrance into a camera mode. In this manner, the user can preset a desired screen mode by the controller 180 to directly enter a favorite mode.

In this instance, when the user touches the first button unit 131 in the lock state or inactive state, the finger scan function may not be executed. Instead, the finger scan function may be activated when the first button unit 131 is pushed by a predetermined force or more. However, in the active state, in a finger scan request state for releasing the lock state, or in a state of requesting a fingerprint input for self-authentication, the finger scan mode may automatically be activated by the controller 180 and thus the user can input the fingerprint automatically at the same time of inputting a touch.

FIG. 16 is an exemplary view illustrating operations upon a banking-related payment in the third exemplary embodiment disclosed herein. Referring to FIG. 16, in a state of waiting for a payment during an execution of a banking-related application, when the user inputs (see (a) of FIG. 16) the fingerprint through the finger scan sensor 131, an available payment-related list (card list) may be output (see (b) of FIG. 16). In this instance, the payment-related list may be payment means and payment methods including credit cards, saving cards, coupons and the like to be used for payment.

Afterwards, when a specific card is output (see (c) of FIG. 16) by moving the card list up and down using the upper button 1321 and the lower button 1322 of the second button unit 132, the specific card may be selected by pushing the first button unit 131. For example, when desiring to use an N card of (a) of FIG. 16, the N card may be searched by using the second button unit 132 and selected. When the card is selected, payment-related items may be output (see (e) of FIG. 16).

Even when desiring to a payment method, a payment in a lump sum or a number months in installment payment may be selected by pushing the second button unit 132.

In this manner, when a list of the content (or application) is a payment card list, a payment method of the specific card selected by the second button unit 132 may be selected by pushing and/or scrolling the first and second button units 131 and 132, such that the payment can be made via the specific card. The payment method may correspond to a payment in a lump sum or in installment over 2 months.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:
1. A mobile terminal, comprising:
a case covering a rear surface of a terminal body;
a rear input unit provided at an inner side of the case, externally exposed through the case, and including a first button unit for inputting a first function, and a second button unit for inputting a second function,
wherein the first button unit is externally exposed through the second button unit; and
a fixing member provided at an inner side of the rear input unit, and capable of fixing the first button unit by being accommodated in a recess outwardly formed in the second button unit,
a first flexible printed circuit board provided on a rear surface of the first button unit and capable of controlling a finger scan sensor connected to the first flexible printed circuit board;
a second flexible printed circuit board provided in the fixing member spaced apart from the first flexible printed circuit board;
wherein the fixing member is coupled to the second button unit and a finger scan sensor is provided on the first button unit,
wherein the fixing member is elastic to transfer the external force to first and second dome switches to perform the first and second functions in response to the first and second button units being pushed, and
wherein the fixing member has a groove formed at one side of the fixing member and a connecting portion of the first flexible printed circuit board connecting to a connector externally extends through a groove.

2. The terminal of claim 1, wherein
the second flexible printed circuit board having first and second dome switches to perform the first and second functions in response to the first and second button units being pushed.

3. The terminal of claim 2, wherein the fixing member is provided with slits dividing points corresponding to the first and second button units.

4. The terminal of claim 2, further comprising:
a decoration member provided at an inner side of the case, externally exposed through the case, and having a through hole, through which the rear input unit is externally exposed; and
a supporting member provided at an inner side of the decoration member to cover the inner side of the decoration member,
wherein the supporting member is arranged to be flush with an inner side surface of the case.

5. The terminal of claim 4, wherein the case is provided with a plurality of hooks protruding inwardly, and the supporting member supports the decoration member by virtue of the hooks.

6. The terminal of claim 5, wherein a plurality of guides are formed at an edge of the decoration member in a protruding manner, and guide holes are formed at the supporting member at positions corresponding to the guides such that the guides are inserted therein when coupling the decoration member and the supporting member to each other.

7. The terminal of claim 4, wherein the supporting member is made of a metal material.

8. The terminal of claim 4, wherein the decoration member and the second button unit are provided therein with grooves, respectively, through which the first flexible printed circuit board is inserted.

9. The terminal of claim 1, wherein the fixing member is made of rubber with elasticity.

10. A mobile terminal, comprising:
a case covering a rear surface of a terminal body;
a rear input unit provided at an inner side of the case, externally exposed through the case, and including a first button unit for inputting a first function, and a second button unit for inputting a second function, wherein the first button unit is externally exposed through the second button unit;
first and second dome switches provided at an inner side of the rear input unit, and located at positions corresponding to the first and second button units so as to perform the first and second functions in response to the first and second button units being pushed; and
a flexible printed circuit board having the first and second dome switches,
wherein the flexible printed circuit board comprises a first flexible printed circuit board having the first dome switch, and a second flexible printed circuit board having the second dome switches,
wherein the first flexible printed circuit board is located at an inner space of the second flexible printed circuit board and is arranged on the same plane as the second flexible printed circuit board,
wherein the mobile terminal further comprises a fixing member provided at an inner side of the flexible printed circuit board and capable of supporting the flexible printed circuit board, and
wherein the first and second flexible printed circuit boards are formed separate from each other, the first dome switch is formed toward the fixing member, and the second dome switches are formed toward the second button unit.

11. The terminal of claim 10, wherein the second button unit comprises a finger scan sensor.

12. The terminal of claim 10, wherein the first and second flexible printed circuit boards are integrally formed with each other, and
wherein the first and second dome switches protrude toward the supporting member.

13. The terminal of claim 12, wherein the first and second flexible printed circuit boards are electrically connected to each other, and a connector is formed at one side of the flexible printed circuit board and connected to a main printed circuit board.

14. The terminal of claim 10, wherein the first flexible printed circuit board is connected with a first connector, and the second flexible printed circuit board is connected with a second connector, the first and second connectors being electrically connected to a main printed circuit board.

* * * * *